US006791466B1

United States Patent
Chang et al.

(10) Patent No.: US 6,791,466 B1
(45) Date of Patent: *Sep. 14, 2004

(54) APPARATUS FOR PROVIDING WIRELESS TRANSMISSION OF INFORMATION IN ELECTRONIC DISPLAY SYSTEMS AND METHODS OF USING THE SAME

(75) Inventors: Chi-Hwey Chang, Lincoln Park, NJ (US); Yoshitaka Utsumi, Odawara (JP); Giovanni Vannucci, Middletown, NJ (US); Stephen A. Wilkus, Lincroft, NJ (US); Gregory A. Wright, Colts Neck, NJ (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1451 days.

(21) Appl. No.: 08/534,808

(22) Filed: Sep. 25, 1995

(51) Int. Cl.[7] .................................................. H04Q 1/00
(52) U.S. Cl. .................................. 340/825.21; 370/511
(58) Field of Search ................................. 370/511, 512; 340/825.14, 825.2, 825.21; 371/365

(56) References Cited

U.S. PATENT DOCUMENTS

| | | | | |
|---|---|---|---|---|
| 3,214,734 A | * | 10/1965 | Whitehead | 340/825.14 |
| 4,132,867 A | * | 1/1979 | Siglow | 370/512 |
| 4,344,180 A | * | 8/1982 | Cummiskey | 370/511 |
| 4,860,286 A | * | 8/1989 | Forsberg | 370/512 |
| 5,155,746 A | | 10/1992 | Whitehead | 375/111 |
| 5,335,228 A | * | 8/1994 | Bottiglieri | 370/512 |
| 5,348,485 A | | 9/1994 | Briechle et al. | 439/110 |

OTHER PUBLICATIONS

British Post Office Standards (POCSAG), 1979.*

* cited by examiner

Primary Examiner—Brian Zimmerman
(74) Attorney, Agent, or Firm—Craig E. Miller; Charlene Stukenborg; Paul W. Martin (57) ABSTRACT

An apparatus for providing wireless transmission of information in electronic display systems and methods of using the same. In particular, the present invention is directed to an air interface and protocol to facilitate wireless transmission of information from a communication base station or other controlling device to individual electronic display modules.

23 Claims, 3 Drawing Sheets

APPARATUS FOR PROVIDING WIRELESS TRANSMISSION OF INFORMATION IN ELECTRONIC DISPLAY SYSTEMS AND METHODS OF USING THE SAME

BACKGROUND AND SUMMARY OF THE INVENTION

The present invention relates generally to new and novel improvements in an apparatus for providing wireless transmission of information in electronic display systems and method of using the same. More particularly, the present invention relates to an apparatus for providing wireless transmission of information in electronic display systems using an air interface and protocol to provide transmission of information from a communication base system to individual electronic display modules and method of using the same.

Large retail stores often deal with several tens of thousands of different kinds of goods. In such stores, much attention is paid to the management and control of the inventory of goods and the displaying and labeling of the prices of the goods being sold. Accordingly, much effort is expended and careful attention is paid to managing and controlling the stock of goods in the warehouse and to the labeling of the prices of goods displayed on shelves or showcases. Mistakes as to the labeling of the prices of goods could cause dissatisfaction to customers and damage the reputation of the store.

Accordingly, it is desirable to correctly identify the correct prices of goods and minimize the number of pricing errors. Therefore, electronic display systems having multiple electronic display modules have been developed. Such electronic display systems are typically arranged such that light-weight, compact electronic display modules which indicate the prices of goods are placed on display shelves or showcases. Such an arrangement allows the prices indicated for the goods in the electronic display portions of the electronic display modules to be changed when the prices of goods are to be raised or lowered and/or when the arrangement of goods displayed on the display shelves or showcases are to be changed. In accordance with such an electronic display system, it becomes possible to reliably identify the correct prices of goods since changes in the prices of goods displayed on the electronic display portions of the electronic display modules are controlled and managed by a communication base station or some other control processing unit. If desired, other product information, for example, the unit price (i.e., the price per pound, etc.), promotional messages, inventory or stocking information, product identification numbers or codes, and product volume or weight, could be display on the electronic display portions of the electronic display modules. In addition, electronic display systems in accordance with the present invention could be used in applications other than retail store environments, for example, in identifying inventory information in warehouses or distribution centers.

Accordingly, an object of the present invention is to provide an apparatus for providing wireless transmission of information in electronic display systems and method of using the same from a communication base station to individual electronic display modules in electronic display systems.

Another object of the present invention is the provision of an apparatus for providing wireless transmission of information in electronic display systems and method of using the same which minimizes customer dissatisfaction due to discords between the prices of goods confirmed by the customer from the electronic display module and the prices of goods registered at the cash counter.

These and other objects of the present invention are attained by the provision of an apparatus for providing wireless transmission of information in electronic display systems and method of using the same in accordance with the present invention. In particular, the present invention is directed to an air interface and protocol for wireless transmission of information from a communication base station or other controlling device to individual electronic display modules.

Other objects, advantages and novel features of the present invention will become apparent when considered in conjunction with the accompanying drawings.

DETAILED DESCRIPTION OF THE DRAWINGS

Figure 1:
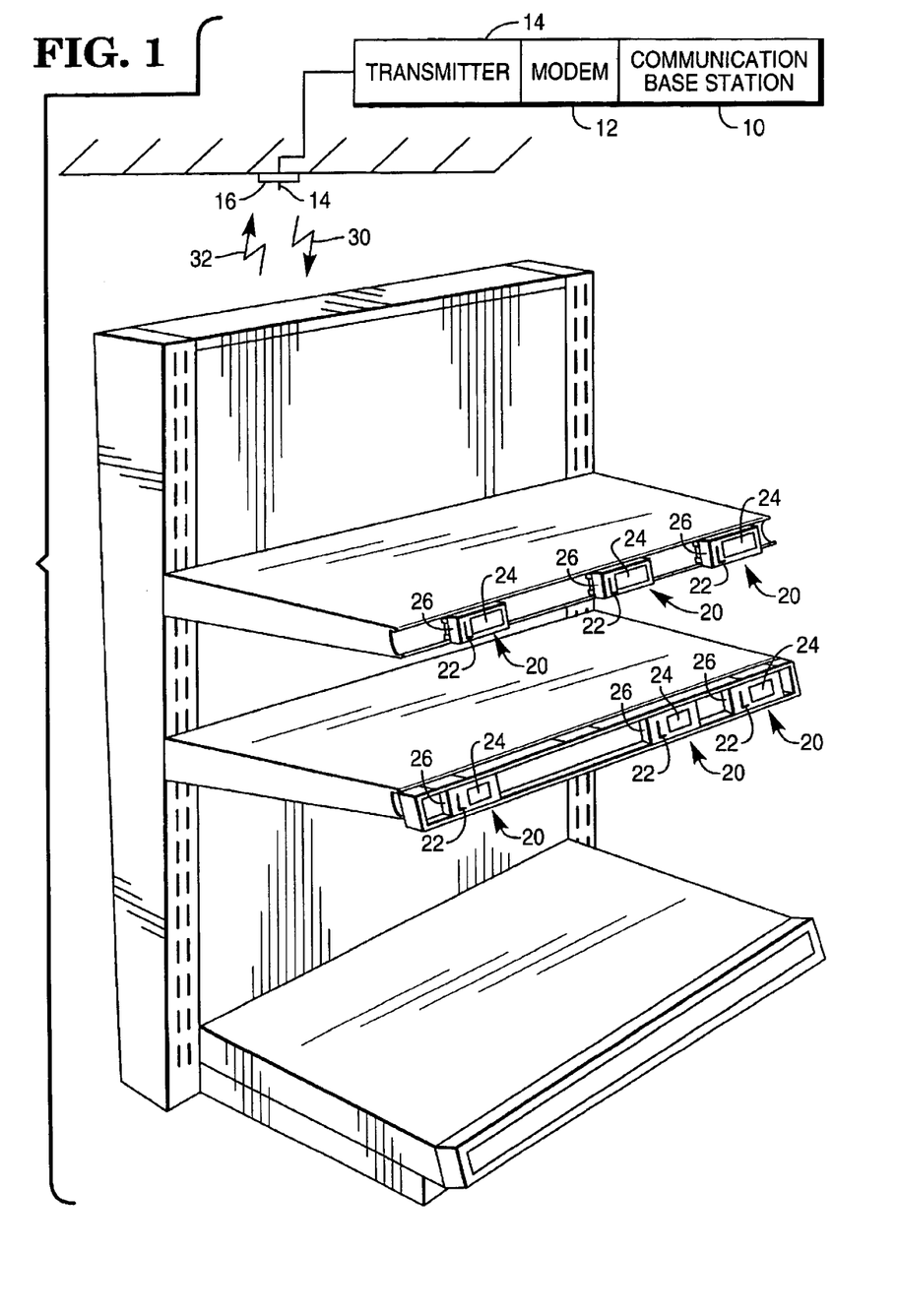
FIG. 1, which represents a preferred embodiment of an apparatus for providing wireless transmission of information in electronic display systems in accordance with the present invention, is a perspective view illustrating the construction of a typical electronic display system, including a communication base station, a ceiling mounted transmitting/receiving antenna and a typical display showcase having multiple shelves and a plurality of shelf mounted electronic display modules mounted thereon.

Referring now to the drawings, in which like-referenced characters indicate corresponding elements throughout the several views, attention is first directed to FIG. 1 which illustrates a perspective view of an electronic display system in accordance with a preferred embodiment of the present invention. Electronic display system generally includes communication base station 10 and one or more electronic display modules 20. In practice, a single communication base station 10 generally services a plurality of electronic display modules 20. Product information, such as price, unit price (i.e., the price per pound, etc.), promotional messages, inventory or stocking information, and/or product volume or weight, is initially entered and stored in communication base station 10. Such information is then transmitted to individual electronic display modules 20 via modem 12 and transmitter 14. Electronic display modules 20 generally include antenna 22 which receives information transmitted by transmitter 14 or communication base station 10. The received information is then entered into a microcomputer (not shown) via a modem (not shown) in electronic display modules 20. Microcomputer (not shown) then forwards the information received via a display driver (not shown) for display on electronic display portion 24 of electronic display modules 20. If desired, switch 26 on electronic display modules 20 can be provided to permit selection of information to be displayed on electronic display portion 24 of electronic display modules 20, for example switching from product price to unit price, promotional messages, product identification number or code or inventory or stocking information.

In order to better understand the following tables, it will be beneficial to define several conventions which were used in connection with the present invention. First, in all Figures and Tables, the first bit transmitted is shown to the left unless otherwise noted. Second, all bit patterns described in these examples are the values before being scrambled by a random number generator for transmittal. Third, since base communication station 10 is on the transmittal side of radio link messages, all protocol procedures and messages are defined as if they were initiated from base communication station 10. Fourth, in every time-slot, system information is broadcast every 16 frames. The burst that contains this information is called the system information burst. Fifth, electronic display portion 24 always blinks. The displaying of a static price or message is a special case where electronic display portion 24 is blinking display register 0 with itself. At a scheduled time, electronic shelf module 20 swaps display register 0 with another display register according to the swap mode, then starts blinking according to the new display mode which is now the current display mode. Sixth, the time of day is a 16 bit register which is incremented every superframe (23.20 seconds). This permits scheduled events to be set in electronic display module 20 up to 17.60 days in advance. These parameters were selected in view of the fact that finer time resolution or more time range would require more memory and more communication bandwidth. If it is desired to schedule an event more than 17.6 days in advance, base communication station 10 can maintain the event in its internal queue until some time less than 17.6 days prior to the scheduled time of the event.

Table 1 below illustrates the down-link message types which have been defined in an electronic display system in accordance with a preferred embodiment of the present invention:

TABLE 1

Air Interface Down-Link Message Set

| Command Number | Message Name | Description |
| --- | --- | --- |
| 1 | Bed Check | Checks and verifies that the electronic display module exists within the defined communication range. This command also allows the communication base station to confirm that the electronic display module memory has the required check sum. |
| 2 | Price Update | Sends a simple price in binary coded decimal format to take effect at a scheduled time. |
| 3 | Load Memory | Loads binary data at an arbitrary electronic display module memory address. Used for sending promotional messages, the electronic display module identification and serial numbers, time of the day and other desired information. |

TABLE 1-continued

Air Interface Down-Link Message Set

| Command Number | Message Name | Description |
| --- | --- | --- |
| 4 | Change Electronic Display Module Identification Number | The system identification burst is a special case of this command. Checks and verifies the 32 bit electronic display module identification number prior to loading the new 16 bit electronic display module identification number. |
| 5 | Change Display Register | Changes the displayed register without using the scheduled event. |

Electronic display module 20 sends an up-link message for each down-link burst that is addressed to it. This up-link message consists of three chips and each chip is one time slot long. Table 2 below illustrates the up-link message types which have been defined in an electronic display system in accordance with a preferred embodiment of the present invention:

TABLE 2

Air Interface Up-Link Message Set

| 3 Chips | Message Name | Description |
| --- | --- | --- |
| (1,1,1) | Acknowledge | Radio link is satisfactory and no problems with the electronic display module were found. The transmitted command was executed. |

No up-link message can indicate one of the following: (1) electronic display module 20 is in synchronization, but the down-link message has a parity check error; (2) electronic display module 20 is out of synchronization or out of range; (3) electronic display module 20 is broken or out of service (i.e., blocked, stolen, etc.); or (4) electronic display module 20 has an error with memory check which is triggered by the bed check message. In cases (1) through (3) described above, communication base station 10 should retransmit the down-link burst to verify the problem initially observed. In case (4) described above, communication base station 10 should reload the memory in electronic display module 20, with the exception of that portion which caused the error status to be detected.

Table 3 shown below illustrates the registers used for the air interface protocol in electronic display modules 20 in accordance with a preferred embodiment of the present invention. It should be noted that the register numbers do not necessarily indicate their locations in the memory of electronic display module 20. However, proper position of information in memory can assist in reducing the computational requirements of electronic display modules 20. For example, system registers can be kept together for easy down-loading from the superframe message.

TABLE 3

Electronic Display Module Reference Registers

| Register No. | Register Name | Class | Nibbles | Definition |
|---|---|---|---|---|
| 1 | Display Register 0 (Display RAM) | Generic | 27 | This register is accessed by the LCD display driver hardware |
| 2 | Display Register 1 | Generic | 27 | Price Data |
| 3 | Display Register 2 | Generic | 27 | Promotional Data 1/Register Data 3 |
| 4 | Display Register 3 | Generic | 27 | Promotional Data 1/Register Data 2 |
| 5 | Display Register 4 | Generic | 27 | Promotional Data 2/Register Data 1 |
| 6 | Electronic Display Module Identification | Secure | 4 | 16 Bit Store-Specific Identification Code |
| 7 | Serial Number | Secure | 8 | 32 Bit Serial Number Set at Factory |
| 8 | Assigned Time Slot | Secure | 1 | Electronic Display Module Uses This Information to Check if it is Listening to the Correct Time Slot and it is Also Used for Re-Synchronization |
| 9 | Stack | Secure | 16 | Central Processing Unit (CPU) or Microprocessor Operations |
| 10 | Frame Count | Secure | 1 | Counter for Resetting Random Number Generator |
| 11 | Random Number Generator | Secure | 4 | Holding $x_{n-1}$ for De-scrambling |
| 12 | Present Time Slot | System | 1 | Electronic Display Module Uses this Information to Check if it is Listening to the Correct Time Slot and it is Also Used for Re-Synchronization |
| 13 | Store Identification Number | System | 2 | Random Number Selected by Communication Base Station |
| 14 | Divisor | System | 2 | Divisor for Audio Tone Generator |
| 15 | Time of | System | 4 | In Units of Day 23.2 Seconds (Superframe Numbers) |
| 16 | Blink Count | Generic | 2 | Blink Period. Unit is 1.45/2 Seconds |
| 17 | Blink Register | Generic | 1 | Display Register to Display (0–4) |
| 18 | Blink Work Counter | Generic | 1 | To Count Blink Period |
| 19 | Pointer for Promotion | Generic | 1 | Register Pointer for Promotion Display |
| 20 | Event Time | Generic | 4 | When to Change Display |
| 21 | New Register | Generic | 1 | Where New Display is Located (0–4) |
| 22 | Swap Register | Generic | 1 | Which Register to Blink With |
| 23 | Register Number | Generic | 1 | Used for Change Display Register Message |
| 24 | Error Counter | Generic | 2 | Error Counter for Synchronization |
| 25 | Synchronization Counter | Generic | 2 | Frame Counter for Synchronization |
| 26 | System Information Error Counter | Generic | 1 | Error Counter for the Case of System Information |
| 27 | Burst Buffer | Generic | 34 | Raw Received Data |
| 28 | Push Button Timer | Generic | 1 | Timeout for Button |
| 29 | Liquid Crystal Display (LCD) Sum | Generic | 1 | Liquid Crystal Display Data Sum for Checking Display |
| 30 | Error Status | Generic | 1 | Battery Low Status, etc. |
| 31 | Flag Area | Generic | 5 | Flags |
| 32 | Temporary Registers | Generic | 14 | Temporary Registers |
| 33 | Batch Size | System | 2 | Reserved for Pooled Down-Link |
| 34 | Pooled Down-Link | Generic | 2 | Reserved for Pooled Down-Link |
| | Total | | 255 | Nibbles |

In order to load the "Secure" registers, the message has to be received twice consecutively by the assigned electronic display module 20 (i.e., no other message addressing the assigned electronic display module 20 received in between but other system information bursts using the broadcast address are permitted). Communication base station 10 loads the "System" registers with the system information burst which is repeated in every time-slot every 16 frames. The "Generic" registers are loaded immediately.

Figure 2:
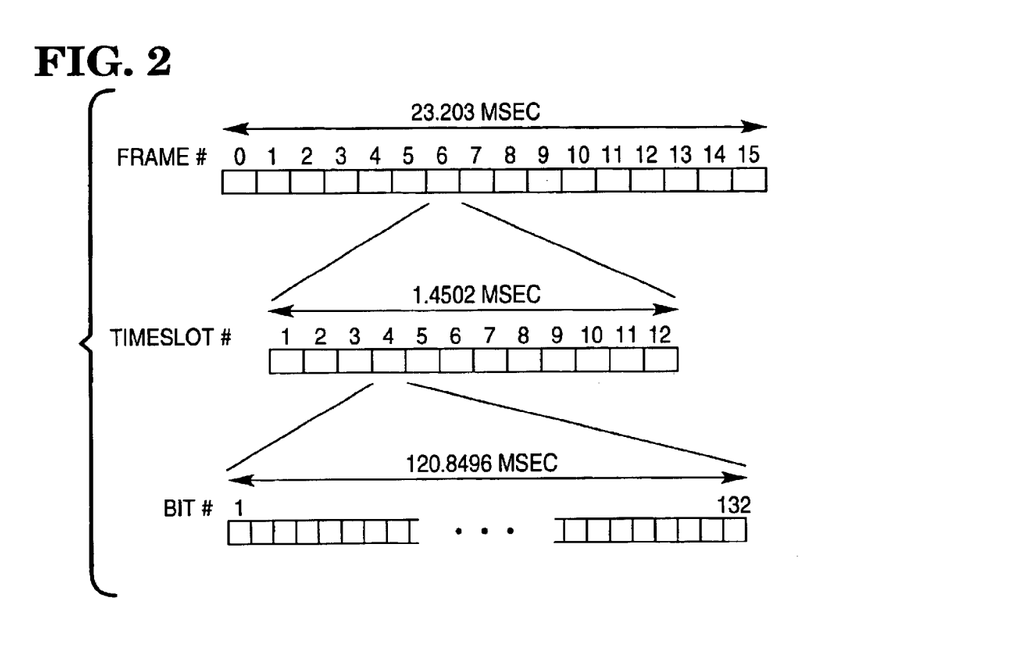
FIG. 2 shows the wireless transmission frame structure for providing wireless transmission of information in electronic display systems in accordance with a preferred embodiment of the present invention.

Referring now to FIG. 2, the wireless transmission frame structure in accordance with a preferred embodiment of the present invention is shown. As seen in reference with FIG. 1, down-link communication channel 30 from communication base station 10 to electronic display modules 20 consists of transmitter 14 at communication base station 10 and antenna 22 at electronic display modules 20. Up-link communication channel 32 from electronic display modules 20 to communication base station 10 consists of transmitter 14 at communication base station 10 which transmits a continuous wave tone, antenna 22 which both receives and transmits at electronic display modules 20 and receiver 16 at communication base station 10. In the preferred embodiment of the present invention shown in FIG. 2, a frame having a duration of 1.4502 seconds is provided. Down-link communication channel 30 consists of a super frame having 16 frames for a total duration of 23.203 seconds. Each frame is divided into 12 time slots with a duration of 120.8496 milliseconds each. In down-link communication channel 30, each frame contains at least one down-link burst. Such a down-link burst contains 132 bit periods with a duration of 915.53 microseconds. The down-link bit rate is then 1092 bits per second. There are three time slots used for the up-link with a duration of 362.55 milliseconds. While the above time durations and values have been found to admirably fulfill the goals and objectives of the present invention, it will be obvious to those having ordinary skill in the relevant art that other time durations and values could be selected which would also accomplish these goals and objectives.

As alluded to above, the previous specific values for bit and frame duration are illustrative only. They were chosen to provide both adequate throughput for the electronic display system, as well as to allow the microcomputer (not shown) in electronic display modules 20 an opportunity to "sleep" for most of the duration of a frame. Yet, microcomputer (not shown) in electronic display modules 20 "wakes up" in time to receive the next frame with its local clock still within bit synchronization with transmitter 14 of base communication station 10. The specific values chosen balance the need for electronic display modules 20 to "wake up" in time to maintain bit synchronization while "sleeping" enough to provide for a long battery life, within the constraint that the clock preferably runs off of a low cost crystal resonator of the type commonly used in wrist watches.

Figure 3:
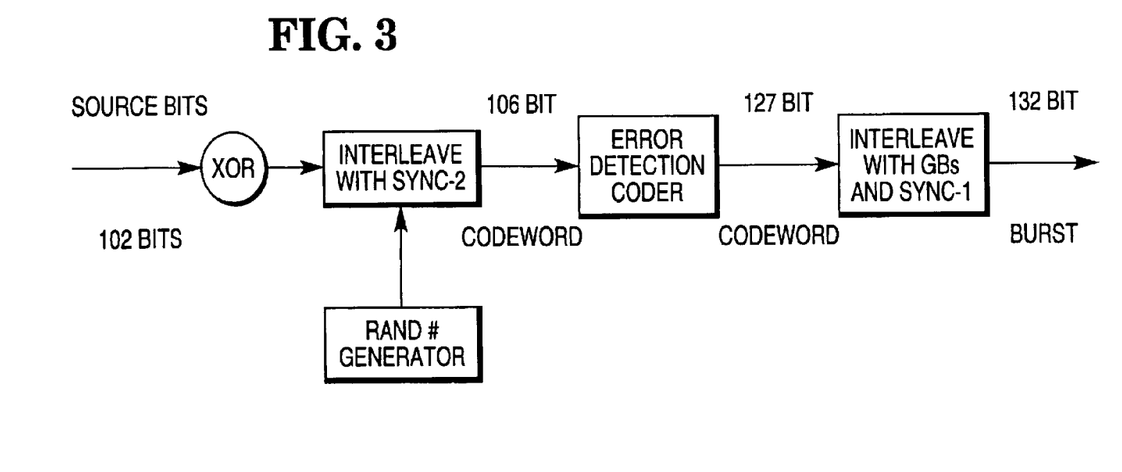
FIG. 3 is a block diagram showing the construction of a down-link burst used in conjunction with a preferred embodiment of the present invention.
Figure 4:
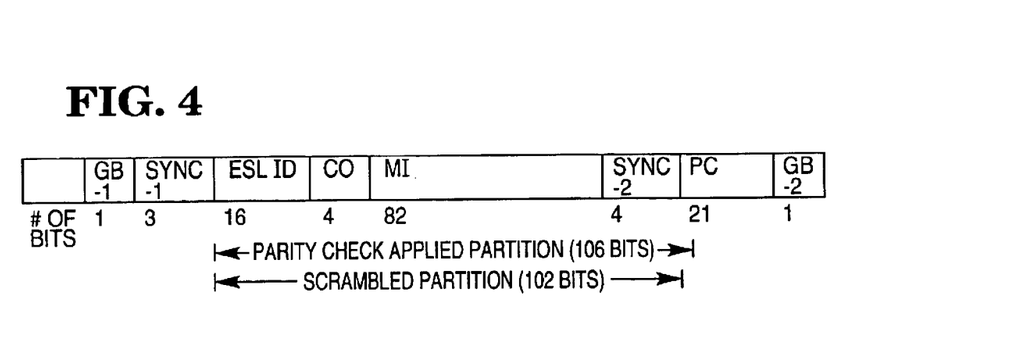
FIG. 4 is a block diagram showing the down-link burst format used in conjunction with a preferred embodiment of the present invention.

Referring now to FIG. 3, the construction of the down-link burst is shown. This operation is performed by communication base station 10. Incoming source bits include electronic display module identification, command and message information as described below. The down-link burst includes guard band partition, address partition, command partition, synchronization partition, message information partition and parity checks partition as shown in FIG. 4. If more than 64 bits are to be loaded into memory by load memory command, then multiple commands must be sent. The purpose of the guard band partition is to protect against turn-on transients and stabilization delays. In the preferred embodiment of the invention described herein, communication base station 10 transmits the following bits in the guard band partitions, $GB_1=(0)$, $GB_2=(1)$.

In the address partition, each electronic display module 20 is assigned a 16 bit address which is independent of the 32 bit factory programmed serial number assigned to each electronic display module 20.

The first 12 bits of,the address partition are used to determine whether the microprocessor for the burst needs to calculate the cycle redundancy check (CRC) or not, and if the least significant bit of the electronic display modules identification address is in these 12 bits, the frequency of cycle redundancy check (CRC) calculation, which is battery consuming, could be reduced.

The command partition contains the message type information. This single nibble preferably takes on the values given in Table 1. Preferably, in synchronization partition, communication base station 10 transmits (1,0,1) in $SYNC_1$ partition, (1,0,0,1) in $SYNC_2$ partition and this partition is not scrambled.

The information associated with the message is in the message information partition. If the information is longer than 82 bits, then it should be broken into two parts. The message information partitions for each message are shown below in Table 4. Note that the "Fill" field has all 1's in it.

TABLE 4

| | | | Bed Check | | | |
|---|---|---|---|---|---|---|
| Content | Starting Memory Address | Number of Nibbles | Checksum | Flags | Parameters | Fill |
| Number of Bits | 8 | 8 | 16 | 8 | 16 | 26 |

This command is used to inquire as to the status of electronic display modules 20 and can be used to confirm that particular electronic display modules 20 are within radio range and operating and can be used to ensure proper operation. This commands electronic display modules 20 to do an arithmetic addition, without overflow control, of the contents of its memory starting at location "Starting Memory Address" and proceeding for "Number of Nibbles". The internally calculated checksum is compared with the transmitted checksum and if these two values are in agreement, an acknowledgment signal is sent back on the up-link message. If the "Number of Nibbles" field is zero, then no checksum calculation is performed and an acknowledgment signal is sent back regardless of the checksum value.

If the checksums do not agree, no acknowledgment signal is sent as there is an inconsistency in memory and the software can determine whether electronic display portion 24 should be changed to " - - - " or not in accordance with the status of the flags field. Communication base station 10 will then preferably reload the particular electronic display module's memory. Diagnostic software can also be beneficial in probing the memory with this command to identify the deficiency.

In the case where the error status nibble is checked by this message, communication base station 10 can determine whether there is any deficiency in a particular electronic display module or not. In such a case, a disagreement as to the checksum does not necessarily mean an inconsistency in memory.

While communication base station 10 transmits the 16 bit checksum described above, electronic display modules 20 do not ordinarily use the high order bits in the checksum comparison. The currently developed electronic display system firmware compares the least significant 8 bits or the checksum. In this way, future extensions to 16 bits can be readily accommodated as electronic display modules having greater memory capability become available.

The price update command, shown below as Table 5, is a single burst way to schedule a price display. It does not have full control over all of the liquid crystal display (LCD) segments, but can display prices. This is a rather computationally involved means of setting the prices, but that complexity allows for efficient use of the communications channel. The price information is transmitted in binary-coded decimal (BCD) format, 1 digit per nibble.

TABLE 5

| | | Price Update | | |
|---|---|---|---|---|
| Content | Scheduled Time-of-Day | Price Data in Binary-Coded Decimal (BCD) Format | Descriptors | Register # |
| Number of Bits | 16 | 48 | 16 | 2 |

Electronic display modules 20 preferably decode the binary-code decimal (BCD) data into segment data and store the result into the display register which is indicated in the Register # section. The Scheduled Time-of-Day is stored in the event time register, the swap register is set to the register # indicated in the register # section and the blink register is set to the register # indicated in the register # section. An acknowledgment message should then be sent.

A group of registers next to each other in the random access memory (RAM) can be updated together by specifying the beginning address and the number of bits to update as shown below in Table 6. Thus, in two bursts, any display register can load any arbitrary electronic display portion 24 of electronic display modules 20 with liquid crystal display (LCD) segment data, for example "SALE/2 For". A third burst can load the display mode and event registers to, for example, schedule a promotion, such as when the "SALE/2 For" should begin to alternate with the displayed price.

TABLE 6

| | Load Register | | | |
|---|---|---|---|---|
| Content | Register Starting Address | Number of Nibbles | Registers Content | Reserved |
| Number of Bits | 8 | 4 | 64 | 6 |

In changing the electronic display module identification address, care should be taken to avoid assigning two electronic display modules 20 in the same store the same identification address, for example, 1111111111111111, the factory preset. In order to initialize electronic display modules 20, unique electronic display module identification addresses should be assigned to each electronic display module 20. In executing a change electronic display module identification address as shown in Table 7 below, the addressed electronic display modules 20 should first confirm that their assigned serial number matches its internal serial number, then a new electronic display module identification address can be assigned, along with an assigned time slot and store identification number.

TABLE 7

| | Change Electronic Display Module Identification Addresses | | | | |
|---|---|---|---|---|---|
| Content | Serial Number | New Identification Address | Assigned Time-Slot | Store Identification Number | Fill |
| Number of Bits | 32 | 16 | 4 | 16 | 14 |

The change display register command, shown below in Table 8, changes the displayed register without using a scheduled event. Bit −0 of the flag field determines the type of command, i.e., Bit −0=0 indicates a start change display register command and Bit −0=1 indicates an end change display register command. The register # field should be the register # to be display by this message. End change display register command should have "0" in this register # field.

TABLE 8

| | Change Display Register | | |
|---|---|---|---|
| Content | Flag | Register # | Fill |
| Number of Bits | 4 | 4 | 74 |

After receiving this message, all addressed electronic display modules 20 within communication, including the case of broadcast address, will change the displayed register to a different register. In this way, the stocking personnel can arrange for all electronic display modules 20 in a store to display, for example, stocking information rather than price information. When the stocking is completed, and the store reopens, the command can be used again to revert to the price display.

It should be remembered that only electronic display modules 20 within radio contact will receive this message. If a particular electronic display module 20 is displaying inventory information when a pallet is placed in front of it, when electronic display modules 20 are commanded with a broadcast identification command to display price register 0, then the blocked electronic display module 20 would not receive the display price register 0 command and would continue to display inventory stocking information even after the store reopens. Until the next bedcheck, there would not be any indication to communication base station that there is any problem with this particular electronic display module. Accordingly, it is advisable to repeat this command frequently to guard against this situation.

In the down-link, the source bits are fed into an encoder that generates 21 parity bits and appends them to the information bits. Thus, this encoder is using a systematic code (it sends "cleartext"). The source bits include the address partition, command partition, message information partition and sync partition. The Bose-Chaudhuri-Hocquenguem (BCH) (127,106) code shall be used. The generator polynomial is:

$$G(x) = x^{21} + x^{18} + x^{17} + x^{15} + x^{14} + x^{12} + x^{11} + x^8 + x^7 + x^6 + x^5 + x + 1$$

If the data is represented by the polynomial:

$$M(x) = M_{105}x^{105} + M_{104}x^{104} + \cdots + M_1 x + M_0$$

where the coefficients $M_n$ having value of 0 or 1 represent the 106 information bits from the address partition, command partition, message partition and sync partition in the order shown in burst format. ($M_{105}$ is the first bit transmitted after the guard bits.)

The 127 bits code word is given by:

$$C(x)=M(x)x^{21}+P(x)$$

where P(x) is the added 21 parity bits given by the following equation:

$$P(x)=M(x)x^{21} Mod\ G(x)$$

Electronic display modules 20 should be able to verify the parity check on every received burst. This coding scheme can correct three or fewer errors.

Codeword interleaving applies to the down-link channel. The codeword is surrounded with the guard band partition according to the burst format and the synchronization bits are forced to (1,0,1) and (1,0,0,1).

A random number generator used in conjunction with the present invention scrambles the data for both security and "spectral whiteness" reasons, it ensures that there are no long strings of 1's or 0's that may confound the receiver.

The nominal up-link frequencies and channel numbers are defined in terms of the modulation subcarrier frequencies as shown below in Table 9:

TABLE 9

| Channel No. | Up-Link Channels Frequency [Hz] | Divisor |
|---|---|---|
| $F_0$ | 29127.1 | 2/9 |
| $F_1$ | 24576.0 | 3/16 |
| $F_2$ | 23130.4 | 3/17 |
| $F_3$ | 20971.5 | 4/25 |

These audio tones can be generated with a synthesizer based upon a frequency of 32,768*4=131,072 Hz.

When electronic display modules 20 are receiving link bursts, software programmed in base communication station 10 counts the number of errors that result from comparing the $SYNC_1$ partition with (1,0,1). This counting continues through 128 frames. After the 128th frame, the software compares the accumulated number of errors with a threshold number. If the number of errors is larger than this threshold number, the software will conclude that it has lost synchronization and will begin re-synchronization. If the software concludes that synchronization has not been lost, it will reset the result of counting and start to accumulate errors from the first frame of 128 consecutive frames again.

If the software finds good cycle redundancy check (CRC) results from the down-link message with its electronic display module identification address transmission or its broadcast transmission during 128 frames of accumulation, the software will reset the result of counting errors even if it has not finishing counting over all 128 frames and again start to accumulate errors from the first frame of 128 consecutive frames again. This occurs because a good cycle redundancy check (CRC) check result is reliable evidence that synchronization has not been lost.

For example, in the case that the threshold level is 80 errors per 128 frames, the probability of mis-judgment between in-synchronization and lost-synchronization in a Bit Error Ratio (BER)=$10^{-1}$ environment would be under $10^{-10}$.

Bit synchronization is performed by random logic by itself. Since the bit synchronization circuit in the random logic cannot make status of finishing bit synchronization, software in base communication station 10 should delay some predetermined amount of time to carry out finish bit synchronization. In theory, the logic circuit synchronizes to the incoming bits within one down-link burst. However, in the present invention, it has been found to be advisable to delay for two down-link bursts for bit synchronization.

After electronic display module 20 synchronizes itself to the incoming bits, it should proceed to align its wake-up window with the down-link burst period. It can do this by ORing all the received bits from successive frames. Since most of the bits in the down-link burst are scrambled with a random number generator, it should have a bit pattern of ones or single zeros which are surrounded by ones, for example (1,0,1), except for the second and third bits of the SYNC-2 partition which consists of two zeros in a row after a relatively few frame periods of ORing. Simulations carried out in conjunction with the development of the present invention seem to indicate that for periodic incoming data, no more than 6 frames need to be ORed to achieve a high probability that no other two consecutive zeros are in a row. This "00" bit position gives electronic display module 20 in accordance with the present invention the offset between its power-up window and the down-link burst period. Electronic display module 20 then aligns its wake-up window in the gate array and starts verifying alignment by checking parity. If the parity check fails consistently, electronic display module 20 should again verify synchronization.

Jumping time-slot is performed by random logic which is controlled by the software in electronic display module 20. After the software recognizes how many time-slots or bits should be adjusted, the software forwards this information to the random logic circuit in electronic display module 20. Then the logic circuit changes the time duration of sleeping between wakeup timings of electronic display module 20. As a result, electronic display module 20 changes its wakeup position in the frame.

When it is necessary to acquire de-scramble synchronization, it should re-start the random number generator every frame until it has successfully decoded a system information burst. Then electronic display module 20 will synchronize the random number generator. If electronic display module 20 loses de-scramble synchronization, electronic display module 20 should maintain synchronization by using the frame count register and system information count register as shown in Table 3. The software should again begin de-scramble synchronization if the frame count register indicates that this is not a system information burst and the actual received burst indicates that this is a system information burst, or if the frame count register indicates that this is a system information burst and the actual received burst indicates that it is not a system information burst, or if electronic display module 20 fails to receive system information bursts for ten consecutive times because of bit errors.

To achieve initial synchronization, electronic display module 20 should follow the following procedure:

1. Acquire bit synchronization;
2. Time-slot alignment to any down-link time-slot;
3. Verify burst synchronization by conducting cycle redundancy check (CRC);
4. Acquire de-scramble synchronization;
5. Wait for a change the electronic display module identification address message;
6. Jump to the assigned time-slot; and
7. Acquire de-scramble synchronization again.

During this period of time, each electronic display module 20 is waiting for a change the electronic display module identification address message with its assigned electronic display module identification address. If such a message is not received by particular electronic display modules 20 within one hour, this indicates that the particular electronic display modules 20 are in a time-slot which is not being used by the store. These particular electronic display modules 20 should then jump to the other time-slot and again wait for a electronic display module identification address message with its assigned electronic display module identification address.

Electronic display module 20 should follow the following procedure to achieve re-synchronization:

1. Acquire bit synchronization;
2. Time-slot alignment to any down-link time-slot;
3. Verify burst synchronization by doing cycle redundancy check (CRC);
4. Acquire de-scramble synchronization;
5. Jump to the assigned time-slot; and
6. Acquire de-scramble synchronization again.

After electronic display module 20 acquired the first de-scramble synchronization, electronic display module 20 should have the correct time-slot # since acquiring the de-scramble synchronization generally indicates successful receipt of system information, and the system information has its time-slot #. Thus, electronic display module 20 can jump to the assigned time-slot immediately after acquiring the first de-scramble synchronization. Since electronic display modules 20 should previously have been assigned time-slot #'s, this is not an initial synchronization.

Figure 5:
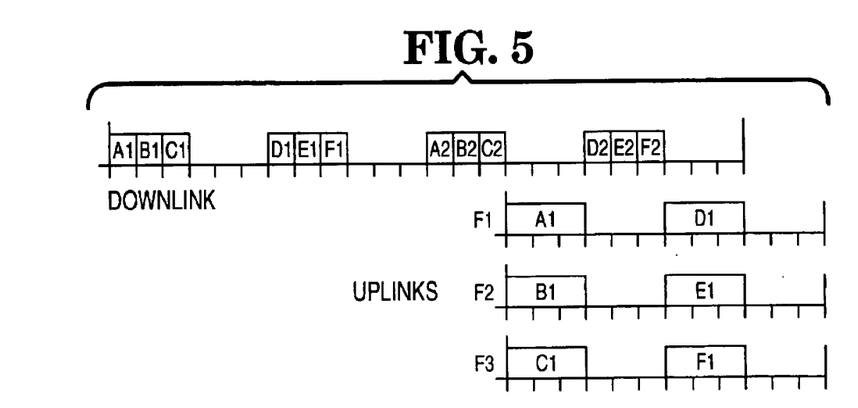
FIG. 5 is a block diagram showing the down-link and up-link frame synchronization in an illustrative application of a store using 6 time-slots and 3 up-link channels in conjunction with a preferred embodiment of the present invention.

In the preferred embodiment of the present invention described herein, the down-link and up-link frames are skewed. As seen in FIG. 5 showing an example of a store using 6 time-slots and 3 up-link channels, the up-link frame is 15 time-slots behind the down-link frames. The radio link capacity is 14,896 (60*60*6/1.45) down-link bursts per hour. Assuming a larger store is allocated 50% of capacity, 7,448 bursts per hour could be transmitted. Since this figure includes also periodic system information bursts, net capacity could be 6,982 messages per hour for electronic display system operating at 50% of the protocol's capacity.

Electronic display modules 20 should complete the following activities in the same down-link frame:

1. De-scramble 12 bits of address partition;
2. Compare its assigned electronic display module identification address and broadcast identification address;
3. Re-scramble 12 bits of address partition;
4. Check it parity;
5. De-scramble the message;
6. Check the whole electronic shelf module identification address;
7. Determine the command type; and
8. Execute the indicated action. Electronic display modules 20 have 15 time-slots of 1.81 seconds to complete these actions. In addition, electronic display modules 20 resistive capacitive (RC) drift should be less than 100 parts per million.

Communication base station 10 can detect the type of error which occurred in a particular electronic display module 20 by checking the error status register, as shown in Table 3, with the bedcheck message. In the case of checking the error status register, a disagreement of the checksum should generally not be treated as a memory error. If the software in electronic display modules 20 find an error, for example, low battery power, the software stores the error status into the error status register. As a result, the contents of the error status register changes from the status of no-error in the particular electronic display modules 20, but communication base station 10 still has a no-error status for those particular electronic display modules 20. Communication base station 10 checks the error status register with the flag of no display change and communication base station 10 will detect a disagreement between the error status register with the no-error status by no acknowledgment. This will indicate to communication base station 10 that particular electronic display modules 20 have detected errors, in this example, low battery power. It should be noted that if some bit patterns are defined to the error status register for various types of errors, communication base station 10 can determine the type of error which those particular electronic display modules 20 are reporting by using multiple bedchecks in accordance with the above described procedure.

During communication base station 10 changes of radio frequency for frequency hopping, communication base station 10 generally needs to turn off the radio frequency power from the beginning of the radio frequency changing operation until it is completed. This time of shutting off power should preferably be carried out during the up-link time slots. If necessary, guard band partitions of the down-link format could be used as a time to shut off power, however, other partitions of the down-link format should generally be sent with stabilized power and frequency in the radio frequency power.

When communication base station 10 turns On/Off its radio frequency power to carry out this frequency hopping operation, the radio frequency power should be switched with minimal chattering so as not to create confusion with bits which may have significance, such as the "00" of SYNC-2 and SYNC-3 partitions, since antenna 22 in electronic display modules 20 will recognize these On/Off transients of radio frequency power as a "0"/"1" bit of manchester encoding when electronic display modules 20 are out of synchronization and are searching for two consecutive zeros.

Although the present invention has been described above in detail, such explanation is by way of example only, and is not to be taken as a limitation on the present invention. For example, electronic display systems in accordance with the present invention could be used in various environments other than retail stores, for example in warehouses and distribution centers. Accordingly, the scope and content of the present invention are to be limited and defined only by the terms of the appended claims.

What is claimed is:

1. A method of achieving synchronization in an electronic display system having a communication base station and at least one electronic display module for displaying price or other product information, said method comprising the steps of:

(a) designating one preselected bit position in multiple bit messages to be transmitted from said communication base station to said at least one electronic display module with a value of zero;

(b) transmitting a plurality of said multiple bit messages in successive frames to said at least one electronic display module, said plurality of messages including guard band partition, address partition, command partition, synchronization partition, message information partition and parity check partition;

(c) said at least one electronic display module receiving said multiple bit messages from said communication base station;

(d) comparing each bit position in said multiple bit messages received;

(e) assigning a value of one if any one of said multiple bit messages has a one in a particular bit position;

(f) assigning a value of zero if all of said multiple bit messages has a zero in a particular bit position;

(g) adjusting synchronization to position said value of zero in its proper orientation within said multiple bit messages based on the first remaining value of zero; and (h) receiving an up-link message indicating synchronization has been achieved using a continuous wave tone.

2. The method of achieving synchronization in an electronic display system in accordance with claim 1, wherein each of said multiple bit messages are of the same length.

3. The method of achieving synchronization in an electronic display system in accordance with claim 2, wherein if no values of zero are identified in said step of assigning a value of zero if all of said multiple bit messages has a zero in a particular bit position, all bit positions are reset and steps (a) through (g) are repeated for an additional group of multiple bite messages.

4. The method of achieving synchronization in an electronic display system in accordance with claim 2, wherein all other bits of said multiple bit messages other than said one preselected bit position in multiple bit messages designated with a value of zero are scrambled prior to transmission by said communication base station.

5. The method of achieving synchronization in an electronic display system in accordance with claim 2, wherein all other bits of said multiple bit messages other than said one preselected bit position in multiple bit messages designated with a value of zero are designated with a value of one.

6. The method of achieving synchronization in an electronic display system in accordance with claim 3 wherein said step of designating one preselected bit position in said multiple bit messages to be transmitted from said communication base station to said at least one electronic display module with a value of zero does not designate the first bit or the last bit in said multiple bit messages with said value of zero.

7. The method of achieving synchronization in an electronic display system in accordance with claim 6, wherein said step of designating one preselected bit position in said multiple bit messages to be transmitted from said communication base station to said at least one electronic display module with a value of zero designate the bit in the second bit position with said value of zero.

8. A method of achieving synchronization in an electronic display module for displaying price or other product information, said method comprising the steps of:

(a) receiving a plurality of multiple bit messages in successive frames from a communication base station, said plurality of multiple bit messages including guard band partition, address partition, command partition, synchronization partition, message information partition and parity check partition;

(b) comparing each bit position in a first and a second multiple bit messages received;

(c) assigning a value of one if any one of either of said first and said second multiple bit messages has a one in a particular bit position;

(d) assigning a value of zero if both of said first and said second multiple bit messages has a zero in a particular bit position;

(e) comparing each bit position in an additional multiple bit message received with the values assigned in steps (c) and (d);

(f) assigning a value of one if any one of either of said values assigned in steps (c) and (d) and said additional multiple bit message has a one in a particular bit position;

(g) assigning a value of zero if both of said values assigned in steps (c) and (d) and said additional multiple bit message has a zero in a particular bit position;

(h) comparing each bit position in an additional multiple bit message received with the values assigned in steps (c) and (d);

(i) assigning a value of one if any one of either of said values assigned in steps (c) and (d) and said additional multiple bit message has a one in a particular bit position;

(j) assigning a value of zero if both of said values assigned in steps (c) and (d) and said additional multiple bit message has a zero in a particular bit position;

(k) continuing with steps (h) through (j) for a predetermined number of times until only one bit position has a value of zero;

(l) adjusting synchronization of said electronic display module to position said value of zero in its proper orientation within said multiple bit messages; and (m) transmitting an up-link message indicating synchronization has been achieved using a continuous wave tone.

9. The method of achieving synchronization in an electronic display module in accordance with claim 8, wherein each of said multiple bit messages are of the same length.

10. The method of achieving synchronization in an electronic display system in accordance with claim 8 wherein all other bits of said multiple bit messages other than said one preselected bit position in multiple bit messages designated with a value of zero are designated with a value of one.

11. The method of achieving synchronization in an electronic display module in accordance with claim 9, wherein six or more multiple bit messages are compared prior to carrying out the step of adjusting synchronization of said electronic display module to position said value of zero in its proper orientation within said multiple bit messages.

12. The method of achieving synchronization in an electronic display module in accordance with claim 7, wherein a total of twelve multiple bit messages are compared prior to carrying out the step of adjusting synchronization of said electronic display module to position said value of zero in its proper orientation within said multiple bit messages.

13. The method of achieving synchronization in an electronic display system in accordance with claim 9, wherein said step of designating one preselected bit position in said multiple bit messages to be transmitted from said communication base station to said at least one electronic display module with a value of zero does not designate the first bit or the last bit in said multiple bit messages with said value of zero.

14. The method of achieving synchronization in an electronic display system in accordance with claim 13, wherein said step of designating one preselected bit position in said multiple bit messages to be transmitted from said communication base station to said at least one electronic display module with a value of zero designate the bit in the second bit position with said value of zero.

15. The method of achieving synchronization in an electronic display system in accordance with claim 9, wherein all other bits of said multiple bit messages other than said one preselected bit position in multiple bit messages designated with a value of zero are scrambled prior to transmission by said communication base station.

16. A method of achieving synchronization in an electronic display system having a communication base station and at least one electronic display module for displaying price or other product information, said method comprising the steps of:

(a) designating a first and a second preselected bit positions in multiple bit messages to be transmitted from said communication base station to said at least one electronic display module with a value of zero;

(b) transmitting a plurality of said multiple bit messages in successive frames to said at least one electronic display module, said plurality of multiple bit messages including guard band partition, address partition, command partition, synchronization partition, message information partition and parity check partition;

(c) said at least one electronic display module receiving said multiple bit messages from said communication base station;

(d) comparing each bit position in said multiple bit messages received;

(e) assigning a value of one if any one of said multiple bit messages has a one in a particular bit position;

(f) assigning a value of zero if all of said multiple bit messages has a zero in a particular;

(g) adjusting synchronization to position said first and said second preselected bit positions in their proper orientation within said multiple bit messages; and (h) receiving an up-link message indicating synchronization has been achieved using a continuous wave tone.

17. The method of achieving synchronization in an electronic display system in accordance with claim 16, wherein each of said multiple bit messages are of the same length.

18. The method of achieving synchronization in an electronic display system in accordance with claim 17, wherein said first and said second preselected bit positions in multiple bit messages to be transmitted from said communication base station to said at least one electronic display module occupy adjacent positions in said multiple bit messages.

19. The method of achieving synchronization in an electronic display system in accordance with claim 17 wherein said wherein said first and said second preselected bit positions in multiple bit messages to be transmitted from said communication base station to said at least one electronic display module are separated by at least one non-zero value in said multiple bit messages.

20. The method of achieving synchronization in an electronic display system in accordance with claim 17, further including a third preselected bit position in said multiple bit messages to be transmitted from said communication base station to said at least one electronic display module, wherein two of said first, said second and said third preselected bit positions in multiple bit messages occupy adjacent positions in said multiple bit messages and the remaining one of said first, said second and said third preselected bit positions in multiple bit messages is separated by at least one non-zero value from the other two of said first, said second and said third preselected bit positions which occupy adjacent positions in said multiple bit messages.

21. The method of achieving synchronization in an electronic display system in accordance with claim 17, wherein said step of designating said first and said second preselected bit positions in said multiple bit messages to be transmitted from said communication base station to said at least one electronic display module with a value of zero does not designate the first bit or the last bit in said multiple bit messages with said value of zero.

22. The method of achieving synchronization in an electronic display system in accordance with claim 17, wherein all other bits of said multiple bit messages other than said first and said second preselected bit positions in multiple bit messages designated with a value of zero are scrambled prior to transmission by said communication base station.

23. The method of achieving synchronization in an electronic display system in accordance with claim 17, wherein all other bits of said multiple bit messages other than said first and said second preselected bit positions in multiple bit messages designated with a value of zero are designated with a value of one.

* * * * *

UNITED STATES PATENT AND TRADEMARK OFFICE
CERTIFICATE OF CORRECTION

PATENT NO.    : 6,791,466 B1
DATED         : September 14, 2004
INVENTOR(S)   : Chang et al.

It is certified that error appears in the above-identified patent and that said Letters Patent is hereby corrected as shown below:

Column 17,
Line 24, after "particular" insert -- bit position --.

Signed and Sealed this

Twelfth Day of April, 2005

JON W. DUDAS
*Director of the United States Patent and Trademark Office*